United States Patent Office 2,924,236
Patented Feb. 9, 1960

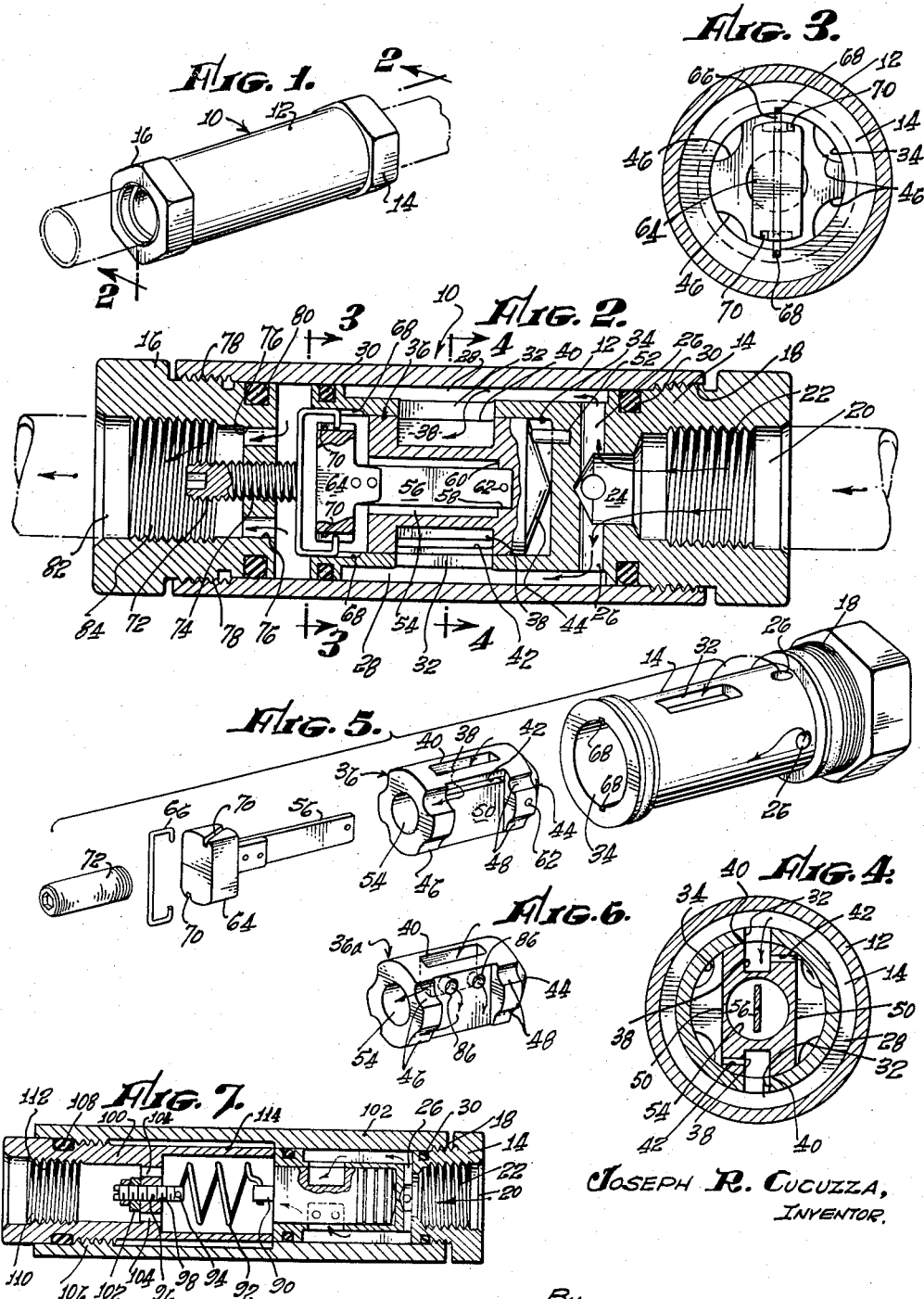

2,924,236

HYDRAULIC FLOW REGULATOR

Joseph R. Cucuzza, Pomona, Calif., assignor to General Dynamics Corporation, San Diego, Calif., a corporation of Delaware Application March 15, 1957, Serial No. 646,390

12 Claims. (Cl. 137—499)

This invention relates generally to apparatus for controlling fluid flow; more particularly, it relates to improved devices for maintaining constant flow in hydraulic circuits.

Heretofore, a variety of devices have been utilized for flow regulation. Known regulators having high sensitivity for a fine degree of flow control have generally been somewhat complex, have required a number of parts, and have been costly to produce. Many of these require continuously moving parts which are subject to a high rate of wear. Among the types of apparatus which have been utilized are turbine devices, propellers, means for producing intermittent averaged flow, pendulums, and devices which operate against spring bias.

In contrast with the prior art, the present invention achieves a fine degree of flow control by providing a device wherein a rotatable member is provided, this member having inlet openings respectively adjacent to regulating apertures. The member has one or more outlet orifices and flow through these orifices exerts a reaction force on the member tending to rotate it against the torque exerted by adjustable spring means to enlarge or reduce the size of the regulating aperture in accordance with changes in flow into the flow regulator. The spring means is adjustable so that the reaction force is balanced by the spring torque at the desired rate of flow.

It is a principal object of the present invention to provide a flow regulator having rapid response to changes in input flow because of low inertial effects.

It is an object of the present invention to provide a sensitive flow regulator for providing a fine degree of flow control.

It is an object of the present invention to provide a flow regulator of simple design which is economical to manufacture.

Other objects and features of the present invention, as well as many advantages thereof, will become apparent to those skilled in the art from a consideration of the following description, the appended claims, and the accompanying drawings in which:

Figure 1 is a perspective view of a preferred embodiment of the present invention;

Figure 2 is a cross-sectional view taken at line 2—2 of Figure 1;

Figure 3 is a cross-sectional view taken at line 3—3 of Figure 2;

Figure 4 is a cross-sectional view taken at line 4—4 of Figure 2;

Figure 5 is an exploded perspective view showing elements of the embodiment shown in Figure 2;

Figure 6 is a perspective view of a modified form of the rotatable vane utilized with the present invention; and Figure 7 is a cross-sectional view of a modified form of flow regulator according to the present invention.

Referring to the drawing, and particularly to Figures 1, 2, 3, 4, and 5, a preferred form of the hydraulic flow regulator is designated by the numeral 10 and is shown as including a tubular housing member 12, a stationary sleeve member 14, and a cap member 16. Sleeve member 14 is connected with tubular housing 12 by threads 18 and has a central axially extending opening 20 and threads 22 for engaging the threads of a hydraulic connection (shown in phantom outline). Extending inwardly of opening 20 is a reduced bore 24 communicating with mutually perpendicular radial bores 26, these in turn communicating with annular chamber 28 formed between tubular housing 12 and sleeve member 14. Sealing for chamber 28 is provided between housing 12 and sleeve member 14 by axially spaced annular sealing devices 30 disposed in annular grooves in sleeve member 14, as shown.

Regulating ports 32 in sleeve member 14 provide communication between annular chamber 28 and central opening 34 in sleeve member 14. Axially extending cylindrical opening 34, defined in member 14, is adapted to receive rotatable vane 36. Vane 36 is provided with accumulation cavities 38 for receiving hydraulic fluid from annular chamber 28 through adjacent regulating ports 32, the outer edges of cavities 38 being adapted to register with inlet ports 32. Slit-shaped orifices 42 provide communication between cavities 38 and the space in axial opening 34 not occupied by vane 36.

Vane 36 is provided with conical upstream end portion 44 to reduce rotational friction between the vane and the end wall of cylindrical opening 34. Pin 52 is mounted in conical portion 44 of vane 36 and is slidably received in a segmental annular groove (not shown) in the end wall of opening 34. Pin 52 seats against the end of this groove to prevent clockwise rotation of vane 36 beyond the position shown in Figure 4. Vane 36 has downstream grooves 46, upstream grooves 48 and flat side portions 50 to provide hydraulic communication within opening 34.

Grooves 46, grooves 48 and flattened sides 50, together with central axial bore 54 in vane 36, reduce the mass of the vane and contribute to minimizing its rotational moment of inertia. This reduces the time for response of vane 36 to rotational forces and increases the sensitivity of flow regulation.

Central axial bore 54 in vane 36 accommodates flat torsional spring 56, the end of which is received in slot 58 in face 60 within the bore. Pin 62 secures spring 56 against axial movement relative to vane 36 to prevent variation of the torsional effects of spring 56 on the vane. The end of spring 56 opposite slot 58 is secured to adjustment fitting 64 by riveting, as shown. C-spring 66 has its axially extending portions seated in grooves 68 at the downstream end of cylindrical opening 34. The confronting ends of C-spring 66 are slidably received in oppositely inclined cam grooves 70 in fitting 64, as shown. Adjusting screw 72 bears upon the radially extending portion of spring 66 and engages threads 74 in the wall of cap member 16. Screw 72 provides means for adjusting the rotational orientation of fitting 64 by varying the axial position of spring 66 to govern the positions of the confronting ends of C-spring 66 in oppositely directed grooves 70. This orientation of adjustment fitting 64 obviously determines the torque exerted by spring 56 on vane 36. Ventholes 76 are provided in cap member 16 for the passage of fluid from the interior of the flow regulator. Cap member 16 is connected to tubular housing 12 by threads 78 and is sealed with respect to housing 12 by annular sealing device 80 disposed in a groove in member 16, as shown. Central axially extending opening 82 in member 16 provides a fluid outlet having threads 84 for engaging a hydraulic coupling (shown in phantom outline).

In the operation of the flow regulator of the present invention, hydraulic fluid under pressure admitted through opening 20 passes through reduced bore 24, then passes through communicating radial bores 26 into annular chamber 28, as indicated by the directional arrows in Figure 2. The fluid then passes through apertures 32, defined in the sleeve portion of member 14, into accumulation cavities 38 in rotatable vane 36, as shown by the directional arrows in Figures 2, 4, and 5. In leaving cavities 38, fluid must pass through restricted orifices 42 to reach the interior of opening 34 in sleeve member 14. Increased fluid velocity causes a pressure differential across each orifice. Reaction forces on vane 36 thereby result and produce a rotational moment tending to rotate vane 36 in a counterclockwise direction (with reference to Figure 4). As shown by the directional arrows in Figure 2, the fluid, on leaving orifices 42, enters the space between vane 36 and the cylindrical wall of opening 34, then passes through grooves 46, past adjustment fitting 64, through holes 76 in cap 16, to outlet opening 82.

With the fluid flow rate through the regulator at a predetermined rate as adjusted by means of screw 72, rotatable vane 36 is in a position somewhat counterclockwise of the position shown in Figure 4, the predetermined torsional force exerted by spring 56 being balanced by the reactive force exerted on vane 36 by fluid flow through orifices 42.

An increase in flow rate above the predetermined desired rate creates a greater pressure drop across orifices 42 and results in an increased reactive force against vane 36 tending to rotate the vane in a counterclockwise direction against the torque exerted by spring 56. Vane 36 rotates until the increased active force is balanced by the increased force exerted by spring 56 because of the twisting of the spring. In the further counterclockwise position of vane 36, fluid flow through apertures 32 is obviously further restricted, thus reducing the flow rate. Thus flow through the regulator cannot increase beyond the predetermined rate.

A decrease in the rate of flow into the annular chamber 28 below the predetermined rate, reduces the pressure drop across orifices 42 and causes a decrease in the reactive force on vane 36 produced by fluid flow through orifices 42. The torsional force exerted by spring 56 is no longer balanced by the reactive force and vane 36 is rotated in a clockwise direction (referring to Figure 4) by spring 56 to a position where these forces are balanced. In the new position the openings for the flow of fluid are obviously enlarged and the predetermined desired flow rate is restored. Therefore it is seen that the flow rate through the regulator cannot decrease below the desired value.

When the rate of fluid flow into annular chamber 28 drops sufficiently below the predetermined selected value, vane 36 is mechanically restrained from clockwise rotation beyond its position shown in Figure 4 by the seating of pin 52 against the end of a segmental annular groove (not shown) in the end wall of opening 34. The edges 40 of cavities 38 are thus held in registration with regulating apertures 32 to permit maximum flow of fluid through the regulator.

Sensitive performance of the regulator is obtained because of the balancing of the torsional force of spring 56 against the reactive force produced by fluid passage through orifices 42.

The spring rate of spring 56, and therefore the particular flow rates to which vane 36 is responsive, is determined by the torque applied to spring 56 by adjusting the position of C-spring 66 with respect to oppositely directed cam grooves 70 in fitting 64. This position is adjusted by turning adjustment screw 72 to vary its axial extension against spring 66. Adjustment screw 72 is readily accessible for adjustment of the flow rate by disengaging the external coupling (shown in phantom outline) from threads 84.

From the foregoing description it will be understood that rotatable vane 36 and the parts with which it cooperates act to maintain a constant rate of flow from flow regulator 10 and it will be understood that the particular rate of flow is determined by the adjustment effected by the appropriate setting of adjustment screw 72.

In the modified form of rotatable vane designated by the reference numeral 36a in Figure 6, slit-shaped orifice 42 (Figure 5) is replaced by circular orifices 86. The operation of this modified form of rotatable vane is substantially the same as that previously described in connection with rotatable vane 36.

A modified form of the present invention is shown in Figure 7. This embodiment differs from the one previously described essentially in that helical spring 92 is used in place of flat torsional spring 56 and a simplified form of adjusting means is used. Adjusting screw 96 is attached directly to spring 92. Extension 90 on the rotatable vane provides means for attaching one end of spring 92. Spring 92 is attached at hole 94 to adjustment screw 96, which is in threaded engagement with wall 98 of sleeve member 100. Locknut 102 preserves the adjustment of screw 96. Sleeve member 100 is connected to tubular housing 102 by threads 106 and sealing is provided between these members by annular sealing device 108, as shown. Central axially extending opening 110 provides an outlet to an exterior coupling (not shown), which is connected to sleeve member 100 by threads 112. Annular tubular axially extending portion 114 of sleeve member 100 seats against sleeve member 14 and fixes the geometrical relationship of the parts, as shown.

The operation of the modified form of the present invention shown in Figure 7 is substantially the same as that previously described in connection with the embodiment shown in Figure 2. From the foregoing description, it will be understood that helical spring 92 and adjustment screw 96 serve to provide means for adjusting the predetermined rate of flow through the flow regulator shown in Figure 7.

A number of modifications in construction may be made without departing from the essential features of the present invention. As an example, more than two cavities 38 and correspondingly more orifices 42 may be provided in rotatable vane 36.

Although specific embodiments of the present invention have been described and illustrated in detail, it is to be clearly understood that the same are by way of illustration and example only; it is to be understood that the invention is not limited thereto, as many variations will be readily apparent to those versed in the art and the invention is to be given its broadest possible interpretation within the terms of the following claims:

I claim:

1. An hydraulic flow regulator comprising a stationary housing having an inlet chamber and an outlet opening, a rotatable element having an inlet opening and a restricted outlet orifice, fluid flow through said outlet orifice producing reactive force on said element, means defining a regulating aperture for communication between said inlet chamber and said inlet opening in said element, means mounting said element for movement relative to said regulating aperture in response to variation in fluid flow through said outlet orifice, and resilient means exerting predetermined force urging said element against said movement, whereby fluid flow above a predetermined rate through said outlet orifice tends to reduce the size of said regulating aperture and flow below said rate tends to increase the size of said aperture.

2. An hydraulic flow regulator comprising a stationary housing having an inlet opening and an outlet passage, means defining an inlet chamber communicating with said inlet opening, sealing parts in said housing to prevent fluid flow from said inlet chamber to said outlet passage, means defining a regulating aperture for passage of fluid from said inlet chamber, a vane mounted for rotation adjacent to said aperture on the side thereof opposite said chamber, said vane having an inlet cavity with a peripheral opening of a configuration similar to said aperture and having an outlet orifice communicating between said cavity and said outlet passage, said outlet orifice being oriented to direct fluid flow so as to urge rotational movement of said vane, resilient means exerting predetermined force urging said vane against said movement, means for selective adjustment of said predetermined force exerted by said resilient means, and stop means preventing movement of said vane in the direction urged by said resilient means beyond the position where said opening in said vane is in registration with said regulating aperture, whereby fluid flow above a predetermined rate tends to reduce the size of said regulating aperture and flow below said rate tends to increase the size of said aperture, such action maintaining a constant rate of flow through the flow regulator.

3. An hydraulic flow regulator comprising a stationary housing having an inlet opening and an outlet passage, means defining an inlet chamber communicating with said inlet opening, sealing parts in said housing to prevent fluid flow from said inlet chamber to said outlet passage, means defining a regulating aperture for passage of fluid from said inlet chamber, a vane mounted for rotation adjacent to said aperture on the side thereof opposite said chamber, said vane having an inlet cavity with a peripheral opening of a configuration similar to said aperture and having an outlet orifice communicating between said cavity and said outlet passage, said outlet orifice being oriented to direct fluid flow so as to urge rotational movement of said vane, spring means engaging said vane for exerting predetermined force opposing said rotational movement urged by fluid flow through said outlet orifice, means for selectively adjusting said predetermined force of said spring means, said means including an adjusting screw for varying the tension of said spring means, and stop means preventing movement of said vane in the direction urged by said resilient means beyond the position where said opening in said vane is in registration with said regulating aperture, whereby fluid flow above a predetermined rate tends to reduce the size of said regulating aperture and flow below said rate tends to increase the size of said aperture, such action maintaining a constant rate of flow through the flow regulator.

4. An hydraulic flow regulator comprising a stationary housing having an inlet opening and an outlet passage, means defining an inlet chamber communicating with said inlet opening, sealing parts in said housing to prevent fluid flow from said inlet chamber to said outlet passage, means defining a regulating aperture for passage of fluid from said inlet chamber, a vane mounted for rotation adjacent to said aperture on the side thereof opposite said chamber, said vane having an inlet cavity with a peripheral opening of a configuration similar to said aperture and having an outlet orifice communicating between said cavity and said outlet passage, said outlet orifice being oriented to direct fluid flow so as to urge rotational movement of said vane, said vane having a central axially extending opening, an axially extending torsional spring disposed in said central opening and engaging said vane, said spring exerting predetermined force opposing said rotational movement urged by fluid flow through said outlet orifice, means for selectively adjusting said predetermined force of said spring means, said means including an adjusting screw for varying the tension of said spring means, and stop means preventing movement of said vane in the direction urged by said resilient means beyond the position where said opening in said vane is in registraton with said regulating aperture, whereby fluid flow above a predetermined rate tends to reduce the size of said regulating aperture and flow below said rate tends to increase the size of said aperture, such action maintaining a constant rate of flow through the flow regulator.

5. An hydraulic flow regulator comprising a stationary housing having an inlet opening and an outlet passage, means defining an inlet chamber communicating with said inlet opening, sealing parts in said housing to prevent fluid flow from said inlet chamber to said outlet opening, means defining a regulating aperture for passage of fluid from said inlet chamber, a vane mounted for rotation adjacent to said aperture on the side thereof opposite said chamber, said vane having an inlet cavity with a peripheral opening of a configuration similar to said aperture and having an outlet orifice communicating between said cavity and said outlet passage, said outlet orifice being oriented to direct fluid flow so as to urge rotational movement of said vane, said vane having a central axially extending opening, an axially extending torsional spring disposed in said central opening and engaging said vane, said spring exerting predetermined force opposing said rotational movement urged by fluid flow through said outlet orifice, a C-shaped adjusting spring having a radially extending portion, axially extending portions, and confronting end portions, means defining axially extending slots in said housing for receiving said axially extending portions, an adjustment fitting attached to said torsional spring and having a pair of cam grooves adapted to receive said end portions of said C-shaped spring, said cam grooves being inclined in opposite directions with respect to the axis of said torsional spring, an adjusting screw arranged for axial movement upon rotation and bearing against said radially extending portion of said C-spring, said screw upon rotation effecting adjustment of the positions in said cam grooves of said end portions of said C-shaped spring in said cam grooves, said adjustment shifting the orientation of said fitting to adjust said predetermined force of said torsional spring, and stop means preventing movement of said vane in the direction urged by said resilient means beyond the position where said opening in said vane is in registration with said regulating aperture, whereby fluid flow above a predetermined rate tends to reduce the size of said regulating aperture and flow below said rate tends to increase the size of said aperture, such action maintaining a constant rate of flow through the flow regulator.

6. An hydraulic flow regulator comprising housing means including a tubular body and defining an outlet passage, a stationary member defining an inlet opening and having an axially extending sleeve portion defining a cylindrical opening and having at least one regulating aperture, said cylindrical opening communicating with said outlet passage, said sleeve portion and said tubular body cooperating to define an annular chamber therebetween, means in said stationary member defining a flow passageway from said inlet opening to said annular chamber, sealing parts between said stationary member and said tubular body for prevening fluid flow from said inlet opening to said outlet passage, a vane mounted for rotation within said cylindrical opening, said vane having at least one inlet cavity with a peripheral opening of a configuration similar to said regulating aperture and having an outlet orifice communicating between said cavity and said cylindrical opening, said outlet orifice being oriented to direct fluid flow so as to urge rotational movement of said vane member, said vane having a central axially extending opening, an axially extending torsional spring disposed in said central opening and engaging said vane, said spring exerting predetermined force opposing said rotational movement urged by fluid flow through said outlet orifice, means for selectively adjusting said predetermined force of said torsional spring, said means including an adjusting screw for varying the tension of said spring, and stop means preventing movement of said vane in the direction urged by said resilient means beyond the position where said opening in said vane is in registration with said regulating aperture, whereby fluid flow above a predetermined rate tends to reduce the size of said regulating aperture and flow below said rate tends to increase the size of said aperture, such action maintaining a constant rate of flow through the flow regulator.

7. An hydraulic flow regulator comprising housing means including a tubular body and defining an outlet passage, a stationary member defining an inlet opening and having an axially extending sleeve portion defining a cylindrical opening and having at least one regulating aperture, said cylindrical opening communicating with said outlet passage, said sleeve portion and said tubular body cooperating to define an annular chamber therebetween, means in said stationary member defining a flow passageway from said inlet opening to said annular chamber, sealing parts between said stationary member and said tubular body for preventing fluid flow from said inlet opening to said outlet passage, a vane mounted for rotation within said cylindrical opening, said vane having at least one inlet cavity with a peripheral opening of a configuration similar to said regulating aperture and having an outlet orifice communicating between said cavity and said cylindrical opening, said outlet orifice being oriented to direct fluid flow so as to urge rotational movement of said vane member, an axially extending helical spring engaging said vane, said helical spring exerting predetermined force opposing said rotational movement urged by fluid flow through said outlet orifice, means for selectively adjusting said predetermined force of said helical spring, said means including an adjusting screw for varying the tension of said spring, and stop means preventing movement of said element in the direction urged by said resilient means beyond the position where said opening in said vane is in registration with said regulating aperture, whereby fluid flow above a predetermined rate tends to reduce the size of said regulating aperture and flow below said rate tends to increase the size of said aperture, such action maintaining a constant rate of flow through the flow regulator.

8. An hydraulic flow regulator comprising a tubular housing, a cap member defining an outlet passage and having a wall with ventholes disposed between said cylindrical opening and said outlet passage, said cap member being threadedly connected to said tubular housing, a stationary member defining an inlet opening and having an axially extending sleeve portion defining a cylindrical opening and defining at least one regulating aperture, said cylindrical opening communicating with said outlet passage, said sleeve portion and said tubular housing cooperating to define an annular chamber therebetween, means in said stationary member defining a flow passageway from said inlet opening to said annular chamber, sealing parts between said stationary member and said tubular housing for preventing fluid flow from said inlet opening to said outlet passage, a vane mounted for rotation within said cylindrical opening, said vane having at least one inlet cavity with a peripheral opening of a configuration similar to said aperture and having an outlet orifice communicating between said cavity and said cylindrical opening, said outlet orifice being oriented to direct fluid flow so as to urge rotational movement of said vane member, said vane having a central axially extending opening, an axially extending torsional spring disposed in said central opening and engaging said vane, said spring exerting predetermined force opposing said rotational movement urged by fluid flow through said outlet orifice, means for selectively adjusting said predetermined force of said torsional spring means, said means including an adjusting screw threadedly engaging said wall in said cap member and connected with said spring for selectively varying the tension of said spring, and stop means preventing movement of said element in the direction urged by said resilient means beyond the position where said opening in said vane is in registration with said regulating aperture, whereby fluid flow above a predetermined rate tends to reduce the size of said regulating aperture and flow below said rate tends to increase the size of said aperture, such action maintaining a constant rate of flow through the flow regulator.

9. An hydraulic flow regulator comprising a stationary housing having an inlet opening and an outlet passage, means defining an inlet chamber communicating with said inlet opening, means defining a regulating aperture for passage of fluid from said inlet chamber, a vane, means mounting said vane for rotation adjacent to said aperture on the side thereof opposite said chamber, said vane having an inlet cavity with a peripheral opening and having an outlet orifice communicating between said cavity and said outlet passage, said outlet orifice being oriented to direct fluid flow so as to urge angular movement of said vane, and resilient means exerting predetermined force urging said vane against said movement, whereby fluid flow above a predetermined rate reduces the size of said regulating aperture and flow below said rate tends to increase the size of said aperture, such action maintaining a constant rate of flow through the flow regulator.

10. An hydraulic flow regulator comprising a stationary housing having an inlet opening and an outlet passage, means defining an inlet chamber communicating with said inlet opening, means defining a regulating aperture for passage of fluid from said inlet chamber, a vane mounted for rotation adjacent to said aperture on the side thereof opposite said chamber, said vane having an inlet cavity with a peripheral opening of a configuration similar to said aperture and having an outlet orifice communicating between said cavity and said outlet passage, said outlet orifice being oriented to direct fluid flow so as to urge rotational movement of said vane, and resilient means exerting predetermined force urging said vane against said movement, whereby fluid flow above a predetermined rate tends to reduce the size of said regulating aperture and flow below said rate tends to increase the size of said aperture, such action maintaining a constant rate of flow through the flow regulator.

11. An hydraulic flow regulator comprising a stationary housing having an inlet opening and an outlet passage, means defining an inlet chamber communicating with said inlet opening, means defining a regulating aperture for passage of fluid from said inlet chamber, a vane mounted for rotation adjacent to said aperture on the side thereof opposite said chamber, said vane having an inlet cavity with a peripheral opening of a configuration similar to said aperture and having an outlet orifice communicating between said cavity and said outlet passage, said outlet orifice being oriented to direct fluid flow so as to urge rotational movement of said vane, spring means engaging said vane for exerting predetermined force opposing said rotational movement urged by fluid flow through said outlet orifice, and means for selectively adjusting said predetermined force of said spring means, said means including an adjusting screw for varying the tension of said spring means, whereby fluid flow above a predetermined rate tends to reduce the size of said regulating aperture and flow below said rate tends to increase the size of said aperture, such action maintaining a constant rate of flow through the flow regulator.

12. An hydraulic flow regulator comprising housing means including a tubular body and defining an outlet passage, a stationary member defining an inlet opening and having an axially extending sleeve portion defining a crylindrical opening and having at least one regulating aperture, said cylindrical opening communicating with said outlet passage, said sleeve portion and said tubular body cooperating to define an annular chamber therebetween, means in said stationary member defining a flow pasageway from said inlet opening to said annular chamber, a vane mounted for rotation within said cylindrical opening, said vane having at least one inlet cavity with a peripheral opening of a configuration similar to said regulating aperture and having an outlet orifice communicating between said cavity and said cylindrical opening, said outlet orifice being oriented to direct fluid flow so as to urge rotational movement of said vane member, said vane having a central axially extending opening, an axially extending torsional spring disposed in said central opening and engaging said vane, said spring exerting predetermined force opposing said rotational movement urged by fluid flow through said outlet orifice, and means for selectively adjusting said predetermined force of said torsional spring, said means including an adjusting screw for varying the tension of said spring, whereby fluid flow above a predetermined rate tends to reduce the size of said regulating aperture and flow below said rate tends to increase the size of said aperture, such action maintaining a constant rate of flow through the flow regulator.

References Cited in the file of this patent

UNITED STATES PATENTS

| | | |
|---|---|---|
| 384,132 | Day | June 5, 1888 |
| 838,725 | Larkin | Dec. 18, 1906 |
| 1,933,852 | Hahn | Nov. 7, 1933 |
| 2,069,022 | Sisk | Jan. 26, 1937 |